Figure 1:
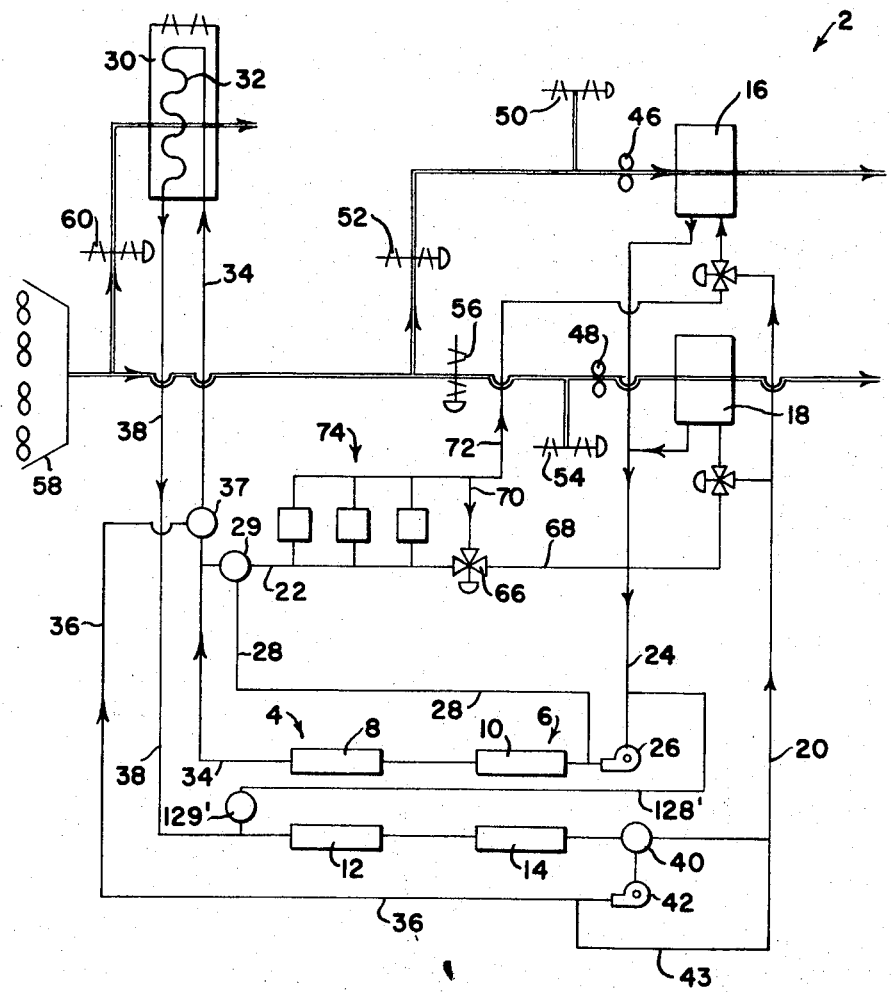

United States Patent [19]

McFarlan

[11] 3,774,674
[45] Nov. 27, 1973

[54] AIR CONDITIONING SYSTEM AND CONTROL INCLUDING METHOD AND MEANS

[76] Inventor: Alden I. McFarlan, 691 Dorian Rd., Westfield, N.J.

[22] Filed: Oct. 13, 1970

[21] Appl. No.: 80,448

[52] U.S. Cl............................ 165/2, 165/22, 165/62
[51] Int. Cl.............................................. F25b 13/00
[58] Field of Search ...................... 165/2, 50, 22, 62

[56] References Cited
UNITED STATES PATENTS
3,024,008  3/1962  Blum.................................... 165/62

Primary Examiner—Charles Sukalo
Attorney—Curtis, Morris and Safford

[57] ABSTRACT

Air conditioning systems which take advantage of the difference between dry bulb and wet bulb conditions, and are especially suited for low humidity climates where there are wide variations in the ambient air temperatures. A system has a plurality of refrigeration units with a hot water stream flowing through the condensors in series, and with a chilled water stream flowing through the evaporator-chillers in series. The system balances the heating and cooling loads so that the internally produced heat is used to heat the periphery when such heat is required. Excess heat is dissipated, and additional heat is provided when necessary. The temperature of the hot water is higher than with the normal practice. The systems are operable to utilize exhaust air to cool heated liquid in a cooling tower or a dry air cooler to thereby carry heat away from the system. The cooling tower can also be used to heat the chilled water with the exhaust air so as to recover and use the heat which would normally be carried away by the exhaust air.

12 Claims, 2 Drawing Figures

AIR CONDITIONING SYSTEM AND CONTROL INCLUDING METHOD AND MEANS

This invention relates to air conditioning systems and methods, and particularly to such systems which heat and cool the various zones or rooms of an overall project, e.g., a building or buildings. The system provides separate streams of chilled water and heated or hot water which are carried through lines to various units which heat or cool the zones, as required.

An object of this invention is to provide improved air conditioning systems and methods. A further object is to provide air conditioning systems which operate in an efficient and dependable manner throughout wide ranges of conditions of use. These and other objects will be in part obvious and in part pointed out below.

In accordance with the present invention, the internally generated heat is used to heat the exterior zones when such heating is required. Excess heat is delivered to a heat sink, and additional heat is added when there is a deficiency. The "breakeven temperature" is the outside air temperature at which the total loss of heat from the overall project to the outside air exactly equals the total heat gain, which is principally the internally created heat. The internally created heat includes the heat produced by the lights, the electrical equipment, the occupants and the components of the refrigeration system.

An important aspect of the present invention is the utilization of 100 percent of the low humidity outside air to aid in providing optimum operating condition. For example, air at relatively high temperature, such as 95° F, but at low humidity, can be used as a heat sink, either as dry air or by spraying water into the air to produce evaporative cooling of the air. For some operating conditions it is advantageous to supply 25 percent outside air to the conditioned spaces by cooling it, for example, from 95° F dry bulb and 66° F–78° F wet bulb cooled to 53.5° F dry bulb and 52.6 wet bulb temperature (approximately 95 percent relative humidity) to produce 75° F and 45 percent RH in the conditioned space. With that mode of operation it may be that no return air is recirculated, and all or a part of the return air may be exhausted through an exhaust-air cooling tower and thereby cool a stream of hot water from the refrigeration units. Assuming that sufficient exhaust air is available, and that after absorbing heat in the conditioned space it is at a lower wet bulb temperature than the outside air, it may provide adequate cooling by evaporation of water in the cooling tower to satisfactorily cool the stream of hot condensing water, for example, to a temperature below the temperature of the return water from the air cooling coils. Hence, the exhausted air carries away part of the heat from the conditioned spaces and the heat which has been extracted from the incoming air by the refrigeration units, plus the added heat of the refrigeration compressor motor.

The same system may also be operated to extract heat from the exhaust air during "winter conditions". For such operation the exhaust air cooling tower is operated "dry" (i.e., without spraying water), and chilled water flows from the chillers through the cooling towers coils and back to the chillers. Hence, heat which is extracted from the exhaust air is transferred by the refrigeration system to the heated water from the condensers to handle the heating load, and is available to load the chillers of the refrigeration plant. With that mode of operation the exhaust air flowing from the cooling tower can be cooled to a temperature substantially below the usual temperature of exhausted air and below that of the outside air. In that manner the system recovers part of the heat, which has been added to the outside air, and which is normally wasted. If the exhausted air is cooled below the incoming outside air, the system also acts as an air-source heat pump by removing heat from the exhaust air which was in the air at the time of entry from the outside.

In the drawings, each of the figures is a schematic representation of one of two embodiments of the invention.

Referring to FIG. 1 of the drawings, an air-source air conditioning system 2 has a refrigeration system formed by two refrigeration units 4 and 6 having condensers 8 and 10, respectively, evaporator-chillers 12 and 14, respectively, and compressors and other standard components (not shown). Chilled liquid is supplied through evaporator-chillers 12 and 14 in series and a valve 40, and thence through a pump 42 to a line 36 or through a line 43 to a chilled liquid distribution line 20. Two air treating units 16 and 18 receive chilled liquid through line 20, and hot liquid through a line 22 and thence through branch lines 72 and 68 respectively, and the liquid returns through a return line 24. A pump 26 directs the liquid either through condensers 10 and 8 in series to a hot liquid line 34, from which it may flow through a valve 29 to line 22, or directly to line 22 through a bypass line 28 and valve 29. During cooling load operations, heated liquid flows from condenser 8 through line 34 to the cooling coil 32 of a cooling tower 30 and thence through a line 38 and evaporator-chillers 12 and 14 in series to chilled liquid line 20. Hence, internal heat has been picked up in units 16 and 18 by the return liquid in line 24 and the return liquid is further heated in the condensers and is then cooled in the cooling tower, thus, to discharge all of the condenser heat and some or all of the internal heat to the outside air. As will be explained more fully below, in this embodiment of the invention, all of the return air may be discharged through cooling tower 30, and water is sprayed in the tower to provide maximum cooling of the liquid flowing through coil 32. Cooling tower 30 may also be operated dry if the operating conditions make that necessary or desirable.

Under high cooling load conditions, it is still necessary to have liquid available in the heated liquid lines 68 and 72. However, the temperature of that liquid may be relatively low as compared with the temperature of heated liquid from condenser 8. Accordingly, bypass line 28 permits the supplying of liquid from the return line 24 through valve 29 directly to line 22. Valve 29 is controlled automatically to provide a mixture of liquid from lines 28 and 34, or liquid solely from either of lines 28 or 34, depending upon the operation conditions. Hence, all or part of the liquid from condenser 8 is delivered to the cooling tower coil 32.

When operating the system so as to recover heat from the air which is being exhausted and as an air-source heat pump, chilled liquid is circulated through coil 32 of cooling tower 30. For that mode of operation, chilled liquid from the evaporator-chillers 12 and 14 blows through valve 40 to pump 42 which directs the chilled liquid through a line 36 and a valve 37 through line 34 and thence through coil 32 and line 38 back to chiller 12. A line 43 connects the outlet of pump 42 to the chilled line 20 so that the air-treating units are provided with a supply of chilled liquid, even though the major portion of the chilled liquid is circulated to the cooling tower. A line 128' having a one-way valve 129' therein connects the return liquid line 24 to line 38 at the inlet of evaporator-chiller 12. That connection provides the desired liquid balance by permitting liquid from the return line to flow to the supply line 38 for the chilled liquid line, that flow being equal to the flow through the chilled liquid lines 43 and 20.

As referred to above and as will be explained more fully below, for the heat pump operation, the chilled liquid flowing through coil 32 picks up the heat from the exhaust air and thereby retains the heat in the system rather than permitting the heat to be discharged with the exhaust air. The heat thus recovered from the exhaust air is carried by the stream of liquid returning in line 38 from the cooling tower, and is removed from the liquid by evaporator-chillers 12 and 14 and delivered to the stream of heated liquid in condensers 8 and 10. At that time there are two major liquid flow paths in the system, one being the heat recovery circuit extending from the evaporator-chillers through pump 42, lines 36 and 34, coil 32, and line 38 back to the evaporator-chillers. The other major flow circuit is the air-heating circuit involving the flow of heated liquid through units 16 and 18, and is from the return line 24 through pump 26, condensers 10 and 8, line 34, valve 29, line 22, lines 68 and 72 to units 18 and 16, respectively, and thence to return line 24. However, even with maximum heating load conditions, a relatively small portion of the chilled liquid may flow from pump 42 through line 43 and the chilled liquid line 20 to units 18 and 16, and there must be a corresponding return flow of liquid to chilled liquid line through line 128' from line 24 to line 38 at the inlet side of evaporator-chiller 12. The one-way check valve 129' permits flow to line 38, but prevents flow in the opposite direction.

Air is supplied to units 16 and 18 by blowers 46 and 48, respectively, with air flowing to blower 46 through outside air louvers 50 and return air louvers 52, and with air flowing to blower 48 through outside air louvers 54 and return air louvers 56. The return air is withdrawn from the conditioned spaces by a blower unit 58. However, all or part of the return air may be exhausted through cooling tower 30. For some conditions of operation, 100 percent outside air is supplied to units 16 and 18 and all of the return air is exhausted through the cooling tower. Also, a mixture of outside and return air is permitted, and the system is operated to maintain an overall heat balance as described in U.S. Pat. No. 3,354,943.

Heated liquid may be supplied directly to unit 18 through a valve 66 and line 68, and to unit 16 through a boiler 74 and line 72. When auxiliary heat is required by unit 16 the liquid is heated by boiler 74, which has three parallel flow paths with separately operably heating means so that any or all of the streams flowing along the paths may be heated. That permits precise control of the heat which is added to the composite stream of heated liquid flowing to line 72. Auxiliary heat may also be supplied to unit 18 by turning valve 66 so that liquid flows from line 72 through a line 70 and valve 66 to line 68. The series flow through the evaporator-chillers is in the opposite direction from the series flow through the condensers of the respective refrigeration units, so that refrigeration unit 6 chills the lowest temperatures liquid while its condensers 10 performs the initial heating of the return liquid from line 24. The final heating of the liquid to the higher temperature is by condenser 8 of refrigeration unit 4 the evaporator-chiller 12 of which performs the initial cooling of the chilled liquid. That reverse series flow arrangement provides maximum heated liquid temperatures and minimum chilled liquid temperatures for any particular operating conditions.

It is possible to provide satisfactory heating and cooling within the conditioned space throughout a wide range of operating conditions. Also, there is a minimum flow of liquid to and from units 16 and 18, through the condenser circuit, the evaporator-chiller circuit, and the cooling tower circuit. That provides maximum temperature heated liquid flowing to units 16 and 18 and during heating, and also provides minimum temperature of the chilled liquid flowing to the units 16 and 18 during cooling load operation and to coil 32 during heat pump operation.

Figure 2:
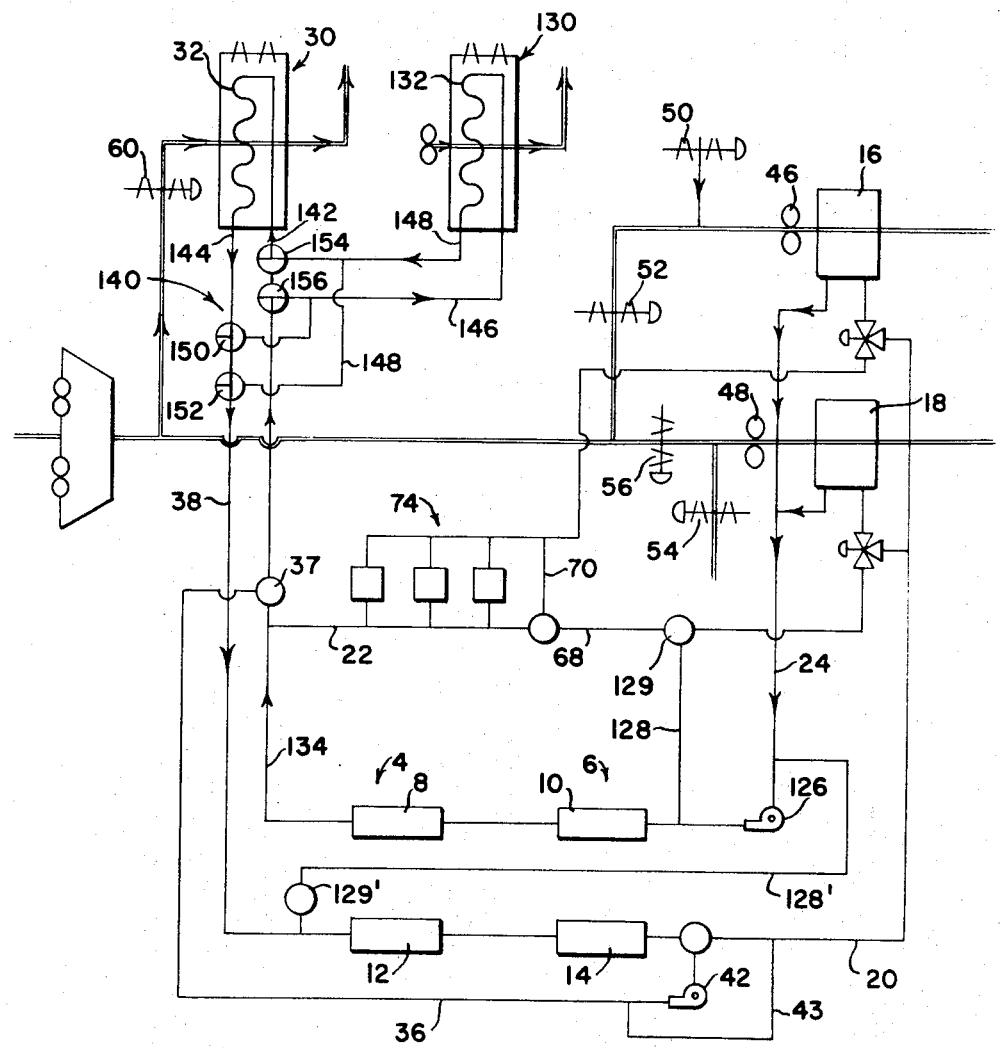

In the embodiment of FIG. 2, the system is similar to that of FIG. 1 with corresponding components and corresponding operations, except for the obvious changes and those specifically explained. There is a liquid circulating pump 126 which is positioned upstream from condenser 10 and circulates the stream of heated liquid in the same manner as pump 26 does in FIG. 1. However, the liquid flow path from condenser 8 and line 134 extends to an "outside air" cooling tower 130 having a coil 132 therein and water spray means. The stream of heated liquid is thereby precooled in tower 130 before flowing to tower 30 and thereby further cooled by the return air which is exhausted through tower 30. The liquid thus cooled is returned through line 38 to the evaporator-chillers 12 and 14 and the chilled liquid flows through line 20 to units 16 and 18. Heated liquid is available to units from line 134. A bypass line 128 extends from the discharge side of pump 126 to a valve 129 in line 68. Valve 129 can be turned to provide water from return line 24 to the internal air-treating unit 18. For heat pump operation, the chilled water from pump 42 can be directed through the cooling towers in series in the same manner as with tower 30 in the embodiment of FIG. 1. The temperature of the heated liquid is cooled through a wide range by the water evaporated in the two towers, so that it is possible to dissipate a relatively large amount of heat with a relatively small stream of liquid. This mode of operation gives excellent results when the outside wet bulb temperature is higher than the return air wet bulb temperature.

However, with the reverse conditions, when the outside wet bulb temperature is below the return air wet bulb temperature for maximum cooling load conditions, it is desirable to flow the stream of heated liquid through the cooling towers in the reverse order. Hence, a valve assembly 140 is provided by which the flow path is reversed, i.e., from line 134 to the inlet line 142 of tower 30 and the outlet line 144 of tower 30 to the inlet line 146 of tower 130, and thence from tower 130 through its outlet line 148 to line 38. This reversal of the flow path is accomplished by turning valves 150 and 156 through an angle of 90° clockwise, and turning valves 152 and 154 90° counterclockwise. Hence, with valves 150, 152, 154 and 156 positioned as shown, the higher wet bulb temperature outside air provides the initial evaporative cooling, and the lower wet bulb temperature exhaust air provides the final evaporative cooling. Similarly, when those valves are turned, as described, the exhaust air provides the initial evaporative cooling and the outside air provides the final cooling.

It is thus seen that tower 130 can be used to pre-cool the liquid or to "post-cool" the liquid. Tower 130 may also be used to "pre-heat" the chilled liquid during the operation whereby heat is being extracted from the air being exhausted. During heat-pump operation the spray is turned off in the towers. Also, during such operation when the chilled liquid is at a temperature above the temperature of the outside air the fan of tower 130 is turned off so that there is no substantial loss of heat in tower 130 to the air. However, when operating conditions make it feasable, the valve assembly 140 may be turned so that the liquid flows directly to and from tower 30, and coil 132 of tower 130 may be drained.

The invention contemplates that return air may be mixed with the outside air for both of units 16 and 18 when such operation is desirable. With the systems herein disclosed the differences between the dry bulb and wet bulb conditions is used advantageously throughout wide ranges of operation. In general it is desirable to provide two cooling towers as in FIG. 2 whenever the wet bulb temperature is above 65° F that "two stage" tower permits the use of the outside air in the manner discussed above to provide improved operating conditions.

What is claimed is:

1. In a method of air conditioning a zone when the outside air may be at a high temperature and at a low relative humidity, the steps of, passing a stream of outside air to the conditioned zone, exhausting a stream of the exhaust air from said conditioned zone, utilizing refrigeration to cool liquid flowing along a cooling path and thereby provide a stream of chilled liquid and to heat liquid flowing along a heating flow path to form a stream of heated liquid, passing said stream of outside air along an air cooling flow path in heat exchange relationship with said stream of chilled liquid, passing said stream of exhaust air along an air heating flow path in heat exchange relationship with said stream of heated liquid, and flowing liquid in a continuous stream along said liquid heating flow path and thence along said air heating flow path and thence along said liquid cooling flow path and thence along said air cooling flow path.

2. The method as described in claim 1 which includes spraying water in the exhausted air to produce evaporative cooling and thereby increase the transfer of heat from said stream of liquid to the exhaust air.

3. The method described in claim 1 wherein said refrigeration is performed by a plurality of refrigeration units which operate to provide a series of cooling steps and a series of heating steps with the cooling flow path being countercurrent to the heating flow path through the respective refrigeration units.

4. The method as described in claim 3 which includes the step of, passing said stream of heated liquid along a pre-cooling path prior to passing along said cooling path, said pre-cooling path being in heat exchange relationship with a separate stream of outside air.

5. The method as described in claim 4 which includes the step of, cooling said stream of outside air by evaporating water therein.

6. Th method as described in claim 3 which includes the step of, passing said stream of heated liquid along a post-cooling path subsequent to passing along said cooling path, said post-cooling path being in heat exchange relationship with a stream of outside air.

7. In a method of air conditioning a plurality of zones wherein one of said zones may require heating while another zone requires cooling and wherein the zones may require cooling simultaneously, the steps of, operating a refrigeration system to cool a stream of chilled liquid and to heat a stream of heated liquid, utilizing said streams of liquid to transfer heat from or to air for said zones to maintain desired temperature conditions within each of said zones, exhausting air from said zones through a cooling zone having a liquid flow path therein which provides a heat exchange relationship between the air being exhausted and liquid flowing along said flow path, flowing heated liquid from said stream along said flow path, and simultaneously spraying water in said tower to thereby utilize evaporative cooling to increase the transfer of heat to said air being exhausted.

8. In a method of air conditioning wherein there is excess heat in the system which must be removed for some conditions of operation and there is a deficiency of heat in the system during other conditions of operation, the steps of, passing a stream of outside air to the zone, exhausting a stream of air from said zone, operating a refrigeration process to cool a stream of chilled liquid and to heat a stream of heated liquid, utilizing said streams of liquid to transfer heat from or to said stream of outside air for said zone to maintain desired temperature conditions therein, passing said stream of air which is being exhausted through an air and liquid heat transfer zone, passing said stream of chilled liquid through said air and liquid heat transfer zone when there is a deficiency of heat in the system, and passing liquid from said stream of hot liquid through said air and liquid heat transfer zone when there is excess heat in the system.

9. The method as described in claim 8 which includes the steps of, evaporating water in said stream of air which is being exhausted when said heated liquid is passed through said heat transfer zone.

10. In a method of air conditioning wherein there is excess heat in the system which must be removed for some conditions of operation and there is a deficiency of heat in the system during other conditions of operation, the steps of, passing a stream of outside air to the zone, operating a refrigeration process to cool a stream of chilled liquid and to heat a stream of heated liquid, utilizing said streams of liquid to transfer heat from or to said stream of outside air for the zone to maintain desired temperature conditions therein, passing a stream of fluid which can act as a heat source and a heat sink through a fluid and liquid heat transfer zone, passing said stream of chilled liquid through said fluid and liquid heat transfer zone when there is a deficiency of heat in the system, and passing liquid from said stream of heated liquid through said fluid and liquid heat transfer zone when there is excess heat in the system.

11. The method of air conditioning as described in claim 10 wherein said stream of fluid comprises a stream of air exhausted from the zone, and which includes the step of passing a stream of outside air into heat exchange relationship with the liquid flowing to said fluid and liquid heat transfer zone.

12. The method of air conditioning as described in claim 10 which includes the steps of adding auxillary heat to the system when there is an unsatisfied deficiency.

* * * * *